(12) United States Patent
Kim et al.

(10) Patent No.: US 12,012,017 B2
(45) Date of Patent: Jun. 18, 2024

(54) SEAT FOR AUTONOMOUS DRIVING VEHICLE

(71) Applicants: HYUNDAI MOTOR COMPANY, Seoul (KR); KIA CORPORATION, Seoul (KR)

(72) Inventors: Bong Ku Kim, Seoul (KR); Deok Soo Lim, Hwaseong-si (KR); Chan Ho Jung, Gunpo-si (KR); Sang Do Park, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 456 days.

(21) Appl. No.: 17/339,459

(22) Filed: Jun. 4, 2021

(65) Prior Publication Data

US 2022/0144148 A1 May 12, 2022

(30) Foreign Application Priority Data

Nov. 10, 2020 (KR) .................. 10-2020-0149451

(51) Int. Cl.
*B60N 2/07* (2006.01)
*B60N 2/02* (2006.01)
*B60N 2/16* (2006.01)

(52) U.S. Cl.
CPC ......... *B60N 2/0735* (2013.01); *B60N 2/0248* (2013.01); *B60N 2/0252* (2013.01); *B60N 2/0732* (2013.01); *B60N 2/163* (2013.01); *B60N 2/02246* (2023.08)

(58) Field of Classification Search
CPC .. B60N 2/0735; B60N 2/0248; B60N 2/0252; B60N 2/0732; B60N 2/163; B60N 2/02246

USPC ........................................ 296/65.13
See application file for complete search history.

(56) References Cited

U.S. PATENT DOCUMENTS

| | | | | |
|---|---|---|---|---|
| 2,497,412 | A * | 2/1950 | Larin ............... | A47C 9/06 297/14 |
| 7,654,602 | B2 * | 2/2010 | Smiley .............. | B66F 9/0759 297/14 |
| 2021/0101505 | A1 * | 4/2021 | Kreutz ............ | B64D 11/06395 |
| 2021/0169229 | A1 * | 6/2021 | Niemela .......... | F16B 12/34 |
| 2021/0253257 | A1 * | 8/2021 | Lokanatha ...... | B64D 11/0691 |
| 2022/0379780 | A1 * | 12/2022 | Salter .............. | B60N 2/3095 |

FOREIGN PATENT DOCUMENTS

| | | | | |
|---|---|---|---|---|
| CN | 202014836 | U * | 10/2011 | ....... A47C 17/62 |
| CS | 202002 | B2 * | 12/1980 | |
| DE | 102015109527 | A1 * | 12/2015 | ....... B60N 2/005 |
| GB | 698517 | A * | 10/1953 | |
| JP | 3178262 | U * | 9/2012 | |
| KR | 10-2015-0074873 | A | 7/2015 | |

* cited by examiner

*Primary Examiner* — Hilary L Gutman
(74) *Attorney, Agent, or Firm* — Morgan, Lewis & Bockius LLP (57) ABSTRACT

A seat for an autonomous driving vehicle includes a cushion part; a back part coupled to a rear end of the cushion part through a recliner and having an adjustable angle in a front and rear direction; and a leg part rotatably coupled to a front end of the cushion part and having a lower side coupled to a seat rail. The back part is disposed to be vertically movable along a back rail located on a rear side of the back part, and the leg part is disposed to be movable back and forth by the seat rail.

11 Claims, 6 Drawing Sheets

SEAT FOR AUTONOMOUS DRIVING VEHICLE

CROSS REFERENCE TO RELATED APPLICATION

The present application claims the benefit of priority of Korean Patent Application No. 10-2020-0149451 filed on Nov. 10, 2020, the entire contents of which is incorporated herein for all purposes by this reference.

TECHNICAL FIELD

The present disclosure relates to a seat for an autonomous driving vehicle, and more specifically, to a seat for an autonomous driving vehicle, which may change the posture of a seat in various forms according to a seating mode of the passenger.

BACKGROUND

An autonomous driving vehicle is a smart vehicle with an autonomous driving technology of finding the destination by itself without a driver's direct operation a steering wheel, an accelerator pedal, a brake, or the like, and in recent years, the development thereof is being made rapidly.

If the autonomous driving situation is universally achieved, the driver may select one of a manual operation mode in which the driver directly operates the vehicle and an autonomous driving mode in which the vehicle drives to the destination by itself without the direct operation of the driver.

Since the driver does not directly operate the vehicle in the autonomous driving mode, the passenger may change the posture of the seat to various seating mode, and as an example, the posture of the seat need to be changed in various forms, such as a general seating mode of the general seating state, a relax mode and a bed mode in which the passenger may take a rest with a comfortable posture, and a cargo loading mode for loading the cargo.

The foregoing explained as the background is intended merely to aid in the understanding of the background of the present disclosure, and is not intended to mean that the present disclosure falls within the purview of the related art that is already known to those skilled in the art.

SUMMARY OF THE DISCLOSURE

An object of the present disclosure is to provide a configuration capable of changing the posture of a seat in various forms according to the use purpose of a vehicle and a seating mode of the passenger as the seat applied to an autonomous driving vehicle, thereby achieving the improvement in the practicality and the merchantability.

A seat for an autonomous driving vehicle according to the present disclosure for achieving the object includes: a cushion part; a back part coupled to a rear end of the cushion part through a recliner and having an adjustable angle in a front and rear direction; and a leg part rotatably coupled to a front end of the cushion part and having a lower side coupled to a seat rail, in which the back part is disposed to be vertically movable along a back rail located on a rear side of the back part, and the leg part is disposed to be movable back and forth by the seat rail.

The back rail is provided on a back panel located on the rear of the back part to extend vertically, and the back rail is coupled to a rail block vertically moving along the back rail.

The rail block and the back part are rotatably coupled through a first hinge pin.

The seat rail includes: a fixing rail fixed to and installed on a floor panel located on the lower side of the leg part to extend in the front and rear direction; and a moving rail coupled to the fixing rail and moving along the fixing rail in the front and rear direction, in which the lower side of the leg part is coupled to the moving rail.

A hinge part is provided to protrude from the upper end of the leg part, and as the hinge part of the leg part is coupled through a second hinge pin in the state of overlapping with the front end of the cushion part, the cushion part and the leg part are rotatably coupled.

The recliner and the seat rail are configured in one of a manual type structure of being manually operated by a lever operation of the user or a power electric type structure of being operated by the power of a motor according to the switch operation.

The cushion part extends in the front and rear direction which is the longitudinal direction of the seat rail, the back part vertically extends at a predetermined angle with the cushion part, and when the leg part is disposed to vertically extend, the seat implements one of a general seating mode or a relax mode.

When compared to the relax mode, the general seating mode has a smaller forward slide movement distance of the leg part, and a smaller reclining angle of the back part.

When compared to the general seating mode, the relax mode has a larger forward slide movement distance of the leg part, and a larger reclining angle of the back part.

The cushion part and the back part linearly extend in the front and rear direction, which is the longitudinal direction of the seat rail, and when the leg part connected to the cushion part is disposed to vertically extend, the seat implements a bed mode.

When the cushion part, the back part, and the leg part linearly extend in the vertical direction which is the longitudinal direction of the back rail and is disposed to be in close contact with the back panel, the seat implements a cargo loading mode capable of loading a cargo in the inner space of the vehicle.

The seat implements one of a general seating mode, a relax mode, a bed mode, or a cargo loading mode according to the changes in the vertical slide movement distance of the back part, the reclining angle of the back part, and the forward and backward slide movement distance of the leg part.

The seat rail includes: a fixing rail fixed to a floor panel, and a moving rail moving along the fixing rail and coupled to the leg part, in which as the moving rail moves when unlocked and is fixed when locked, the entire length of the seat rail is adjustable.

The exemplary embodiment of the present disclosure may provide a configuration in which the back part and the leg part are rotatably coupled to the cushion part, respectively, the back part is installed to be vertically movable along the back rail provided on the back panel, and the leg part is installed to be movable back and forth along the seat rail provided on the floor panel, and may change the posture of the seat in various forms, such as the general seating mode, the relax mode, the bed mode, and the cargo loading mode, according to the use purpose of the vehicle and the seating mode of the passenger in the autonomous driving situation, thereby achieving the improvement in the practicality and the merchantability.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Specific structural to functional descriptions of the exemplary embodiments of the present disclosure disclosed in the present specification or application are only illustrated for the purpose of describing the exemplary embodiments according to the present disclosure, and the exemplary embodiments according to the present disclosure may be embodied in various forms and it should not be construed that the present disclosure is limited to the exemplary embodiments described in the present specification or application.

Since the embodiments according to the present disclosure may be variously changed and have various forms, specific exemplary embodiments will be illustrated in the drawings and described in detail in the present specification or application. However, this is not intended to limit the exemplary embodiments according to the concept of the present disclosure to a particular disclosed form, and it should be understood that the present disclosure includes all changes, equivalents, and substitutes included in the spirit and scope of the present disclosure.

Terms such as first and/or second may be used to describe various components, but the components should not be limited by the terms. The terms are used only for the purpose of distinguishing one component from another, and for example, without departing from the scope according to the concept of the present disclosure, the first component may be named a second component, and similarly, the second component may also be named the first component.

When a component is referred to as being "connected" or "coupled" to another component, the component may be directly connected or coupled to another component, but it should be understood that other components may also be present between the components. On the other hand, when a component is referred to as being "directly connected" or "directly coupled" to another component, it should be understood that there are no other components between the components. Other expressions which describe the relationship between the components, that is, "between" and "immediately between" or "neighboring" and "directly neighboring to" should be interpreted in the same manner.

The terminology used in the present specification is merely for the purpose of describing particular exemplary embodiments, and is not intended to limit the present disclosure. The singular forms may include plural forms unless the contexts clearly indicate the opposite. In the present specification, it may be understood that the term "comprising", "having", or the like specifies the presence of the characteristic, integer, step, operation, component, part, or a combination thereof described, and does not exclude the presence or addition possibility of one or more other characteristics, integers, steps, operations, components, parts or combinations thereof in advance.

Unless defined otherwise, all terms including technical terms or scientific terms used herein have the same meaning as commonly understood by those skilled in the art to which the present disclosure pertains. The terms defined in the dictionary commonly used may be interpreted as having a meaning consistent with the meaning in the context of the related technology, and may not be interpreted as an ideal or excessively formal meaning, unless clearly defined in the present specification.

A control part (controller) according to the exemplary embodiment of the present disclosure may be implemented by a non-volatile memory (not illustrated) configured to store data about an algorithm configured to control the operation of various components of the vehicle or software instructions reproducing the algorithm, and a processor (not illustrated) configured to perform the operation described below using the data stored in the corresponding memory. Here, the memory and the processor may be implemented by a separate chip. Alternatively, the memory and the processor may be implemented by a mutually integrated single chip. The processor may take one or more forms of processors.

Hereinafter, a seat for an autonomous driving vehicle according to an exemplary embodiment of the present disclosure will be described with reference to the accompanying drawings.

As illustrated in FIGS. 1 to 6, a seat for an autonomous driving vehicle according to the present disclosure includes a cushion part 10; a back part 20 coupled to the rear end of the cushion part 10 through a recliner 100 and having an adjustable angle in the front and rear direction; and a leg part 30 rotatably coupled to the front end of the cushion part 10 and having the lower side coupled to a seat rail 200.

Figure 1:
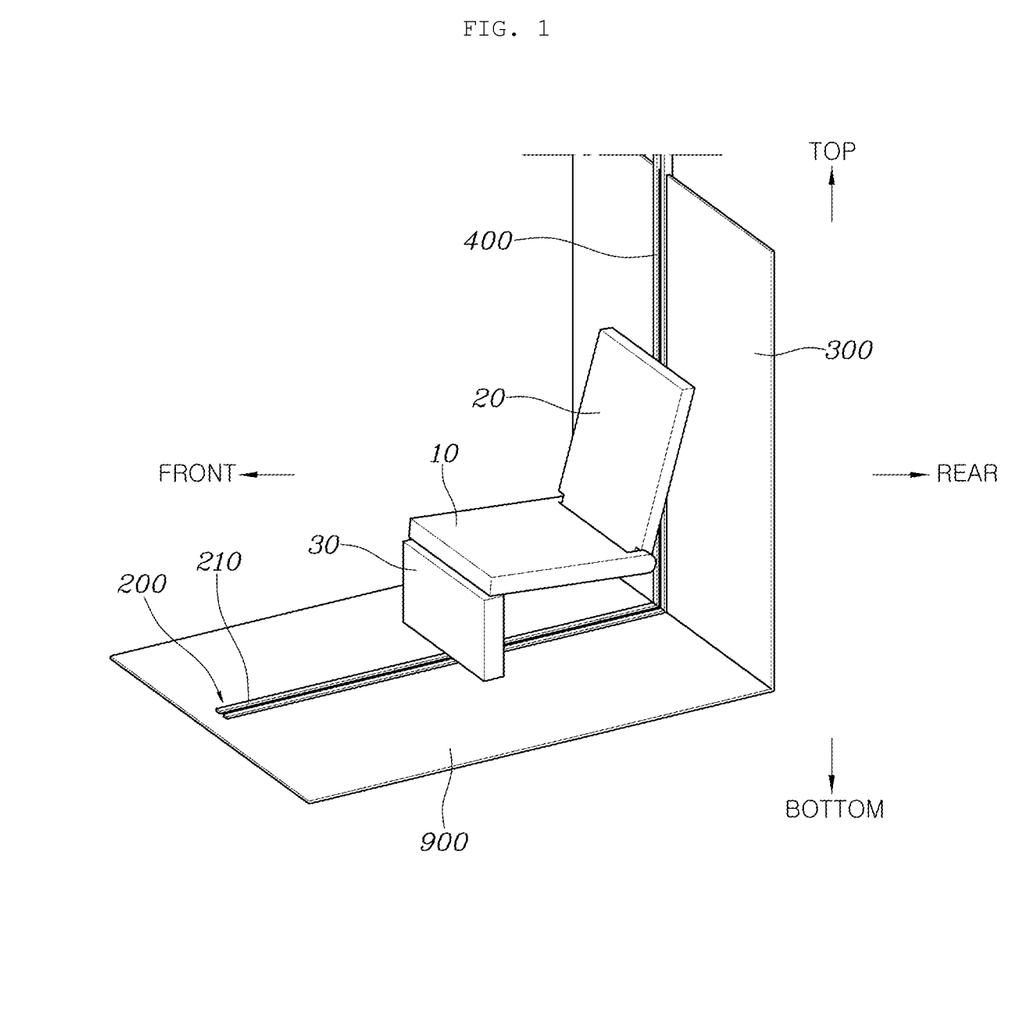
FIG. 1 is a diagram for explaining a seat for an autonomous driving vehicle according to the present disclosure.

The cushion part may be a portion supporting the lower body of the passenger, the back part 20 may be a portion supporting the upper body of the passenger, and the leg part 30 may be a portion supporting the passenger's leg.

The back part 20 may be rotated through the recliner 100 connecting the cushion part 10 to the back part 20 in the front and rear direction, thereby adjusting the front and rear directional angle of the back part 20.

Figure 2:
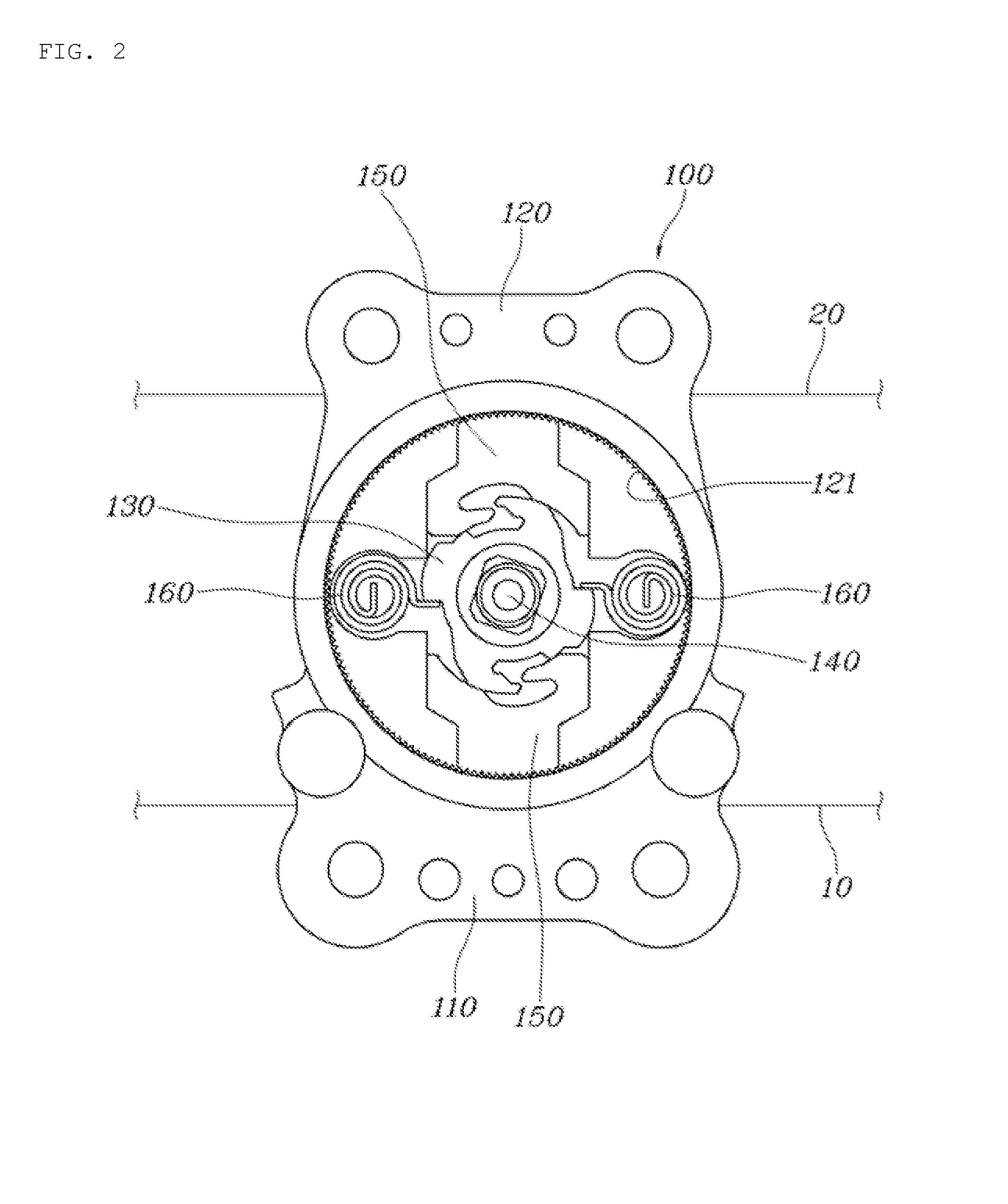
FIG. 2 is a diagram for explaining an example of a recliner applied to the seat according to the present disclosure.

FIG. 2 illustrates an example of the recliner 100 mainly used generally.

As illustrated, the recliner 100 includes a cushion bracket 110 coupled to the cushion part 10, and a back bracket 120 coupled to the back part 20, and the back bracket 120 is formed with a circular gear tooth 121.

A cam member 130 is located in the inner space in which the cushion bracket 110 and the back bracket 120 overlap, a shaft 140 penetrates the center of the cam member 130, a lock gear member 150 is located outside the cam member 130, and the lock gear member 150 is formed with a gear tooth engaged with the gear tooth 121 of the back bracket 120.

FIG. 2 illustrates an engaged state in which the gear tooth of the lock gear member 150 is engaged with the gear tooth 121 of the back bracket 120, and at this time, as the back bracket 120 does not rotate, the back part 20 maintains the locking state which may not be rotated in the front and rear direction.

In the state of FIG. 2, when the shaft 140 rotates, the cam member 130 rotates, and the lock gear member 150 is pulled toward the cam member 130 by the rotation of the cam member 130, and at this time, as the gear engagement between the lock gear member 150 and the back bracket 120 is released, from this time, the back bracket 120 may rotate with respect to the cushion bracket 110, such that as the back part 20 rotates in the front and rear direction, the angle of the back part 20 may be adjusted.

When an external force applied to the shaft 140 is removed, the cam member 130 returns by the elastic force of a return spring 160, and thus the lock gear member 150 is gear-engaged with the back bracket 120 again, such that the back part 20 maintains the locking state which may not be rotated in the front and rear direction again.

The aforementioned recliner 100 has been described as one of various kinds of recliners, for example, such that the recliner 100 is not limited to the above configuration.

Figure 3:
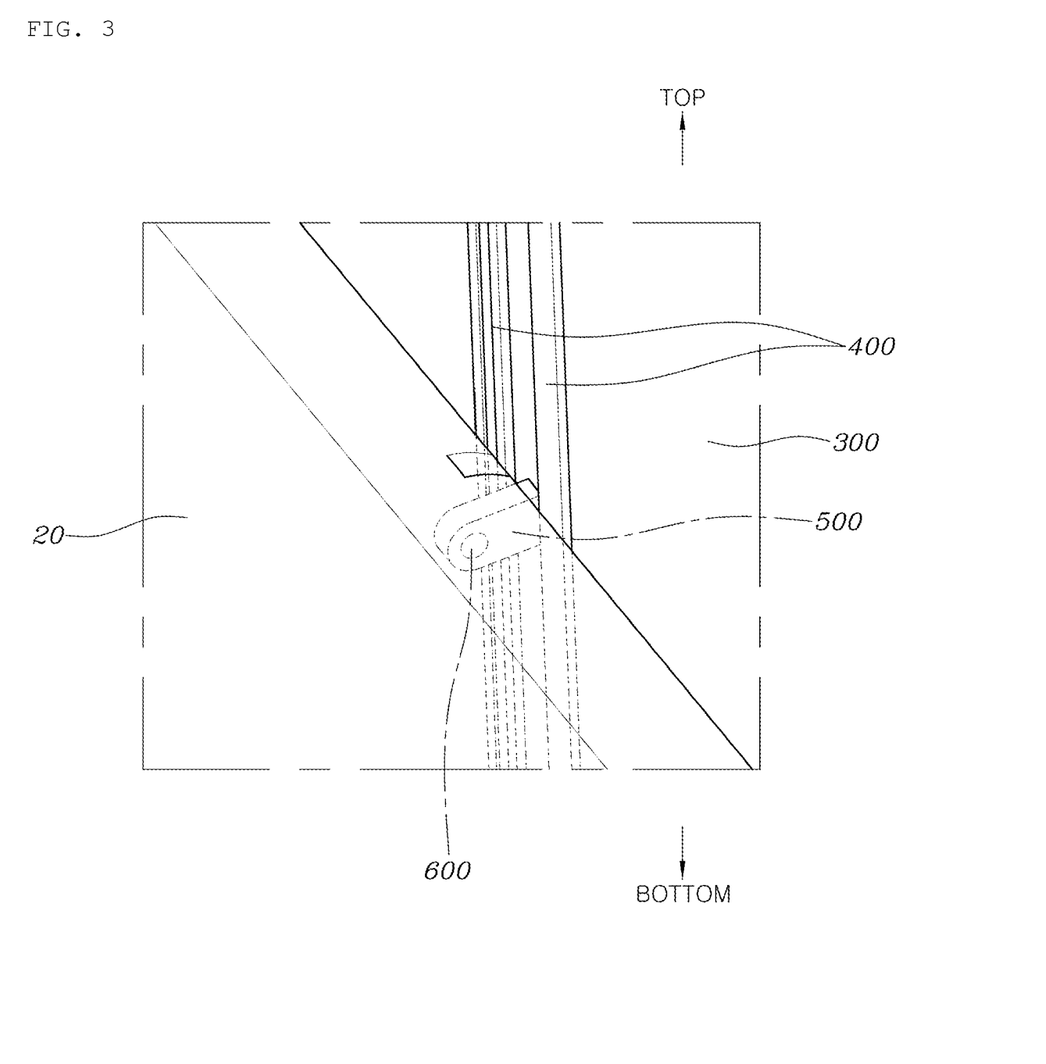
FIG. 3 is a diagram for explaining a connection portion between a back part and a back rail in FIG. 1.

A back panel 300 is located on the rear side of the back part 20 to be disposed vertically, the back panel 300 is provided with a back rail 400 to extend vertically, the back rail 400 is coupled to a rail block 500 vertically moving along the back rail 400, and the rail block 500 and the back part 20 are rotatably coupled through a first hinge pin 600.

Therefore, the back part 20 has a structure installed to be vertically movable along the back rail 400 located on the rear of the back part 20.

Figure 4:
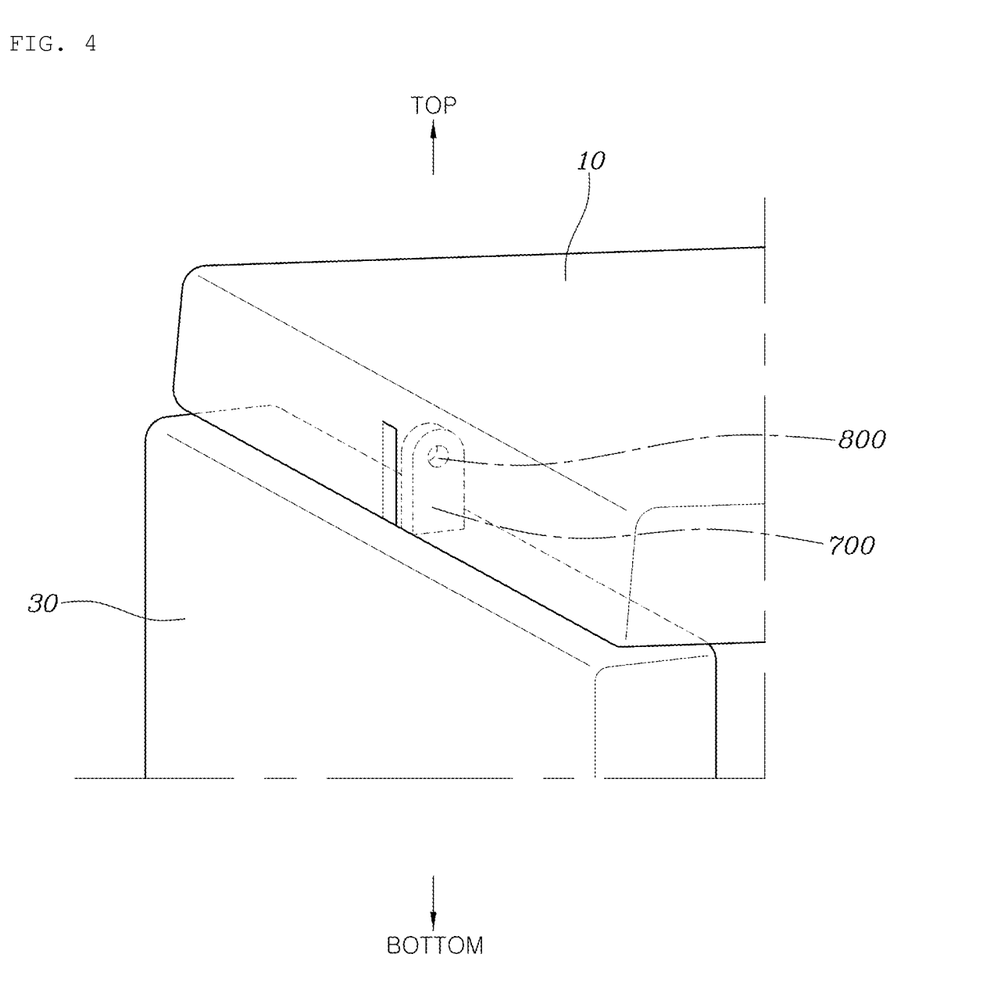
FIG. 4 is a diagram for explaining a connection portion between a cushion part and a leg part in FIG. 1.

A hinge part 700 is provided on the upper end of the leg part 30 to protrude upward, the hinge part 700 of the leg part 30 is coupled through a second hinge pin 800 in the state of overlapping with the front end of the cushion part 10, such that the cushion part 10 and the leg part 30 become a structure of being coupled to each other to be rotatable.

Figure 5:
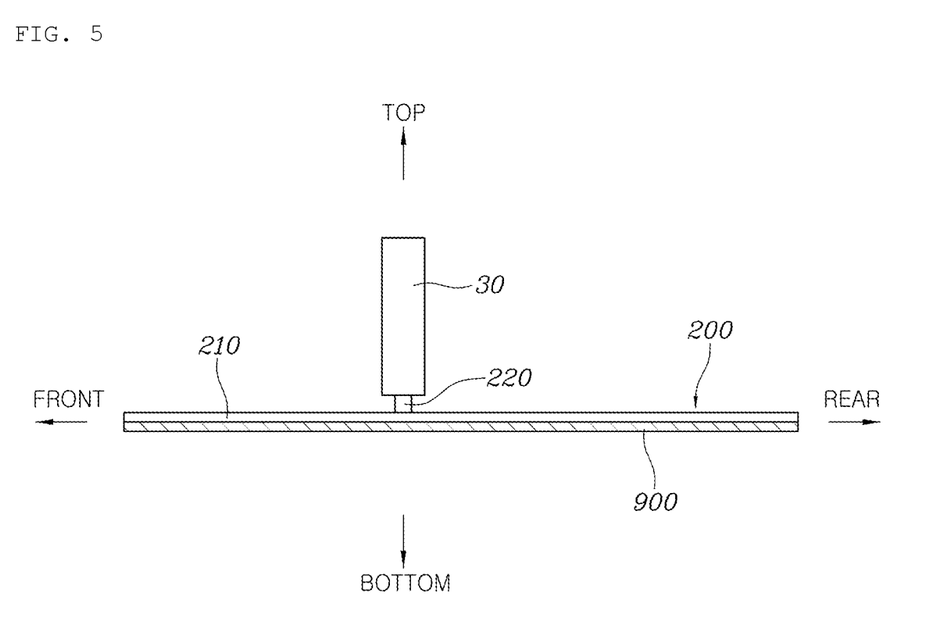
FIG. 5 is a diagram for explaining a connection portion between the leg part and a seat cushion in FIG. 1.

A floor panel 900 is located on the lower side of the leg part 30 to be disposed horizontally, the seat rail 200 is provided on the floor panel 900, and a part of the seat rail 200 becomes a configuration being coupled to the leg part 30.

That is, the seat rail 200 includes a fixing rail 210 fixed to and installed on the floor panel 900 located on the lower side of the leg part 30 to extend in the front and rear direction, and a moving rail 220 coupled to the fixing rail 210 and moving in the front and rear direction along the fixing rail 210, and the lower side of the leg part 30 is coupled to the moving rail 220, and the leg part 30 and the moving rail 220 become a structure of being installed to be movable in the front and rear direction of the floor panel 900 along the fixing rail 210.

The recliner 100 and the seat rail 200 applied to the seat according to the present disclosure may be configured in one of a manual type structure of being manually operated by a lever operation of the user and a power electric type structure of being operated by the power of a motor according to the switch operation.

FIGS. 6A, 6B, 6C, and 6D illustrate a general seating mode, a relax mode, a bed mode, and a cargo loading mode, respectively, implemented by the seat according to the present disclosure.

Figure 6A:
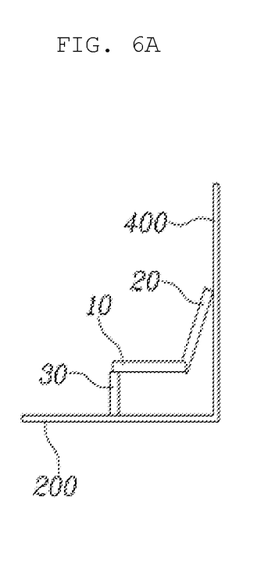
FIGS. 6A-6D are diagrams for explaining a general seating mode, a relax mode, a bed mode, and a cargo loading mode, respectively, implemented by the seat according to the present disclosure.
Figure 6B:
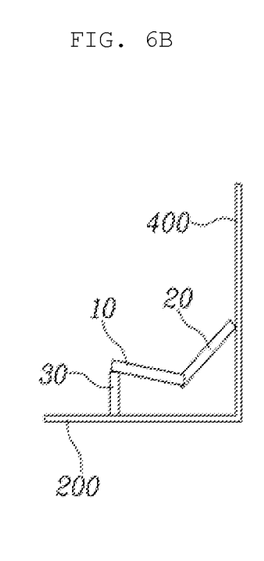

That is, as illustrated in FIGS. 6A and 6B, the cushion part 10 extends in the front and rear direction which is the longitudinal direction of the seat rail 200, and the back part 20 vertically extends at a predetermined angle with the cushion part 10, and when the leg part 30 is disposed to vertically extend, the seat may implement the general seating mode illustrated in FIG. 6A or implement the relax mode illustrated in FIG. 6B.

In the general seating mode, when an angle between the cushion part 10 and the back part 20 is increased, the relax mode may be implemented.

When compared to the relax mode, the general seating mode is characterized by having a smaller forward slide movement distance of the leg part 30, and a smaller reclining angle of the back part 20, and as an example, the forward slide movement distance of the leg part 30 may be 760 mm, and the reclining angle of the back part 20 may be 120 degrees.

When compared to the general seating mode, the relax mode is characterized by having a larger forward slide movement distance of the leg part 30, and a larger reclining angle of the back part 20, and as an example, the forward slide movement distance of the leg part 30 may be 900 mm, and the reclining angle of the back part 20 may be 130 degrees.

Figure 6C:
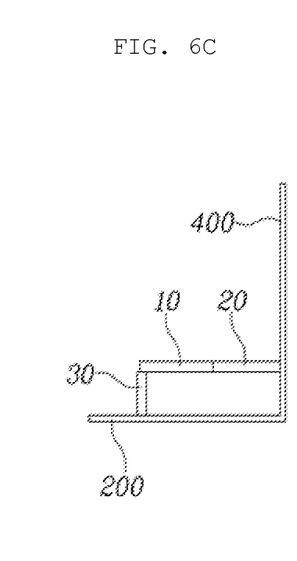

Further, as illustrated in FIG. 6C, the cushion part 10 and the back part 20 linearly extend in the front and rear direction which is the longitudinal direction of the seat rail 200, and when the leg part 30 connected to the cushion part 20 is disposed to vertically extend, the seat may implement the bed mode.

When compared to the relax mode, the bed mode is characterized by having a larger forward slide movement distance of the leg part 30, and a larger reclining angle of the back part 20, and as an example, the forward slide movement distance of the leg part 30 may be 1200 mm, and the reclining angle of the back part 20 may be 180 degrees.

Figure 6D:
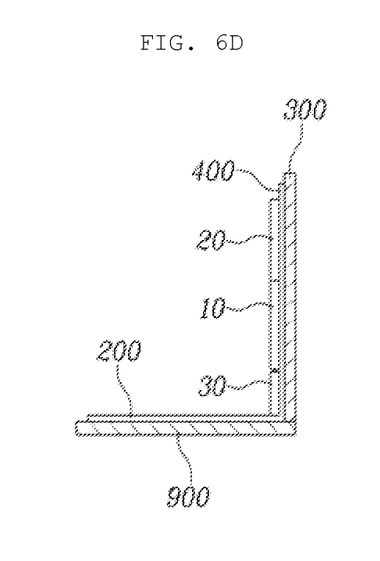

Further, as illustrated in FIG. 6D, when the cushion part 10, the back part 20, and the leg part 30 linearly extend in the vertical direction which is the longitudinal direction of the back rail 400 and are disposed to be in close contact with the back panel 300, the seat may implement the cargo loading mode capable of loading the cargo in the inner space of the vehicle.

In the case of the cargo loading mode, as the leg part 30 is in close contact with the back panel 300, the forward slide movement distance of the leg part 30 may be 0 mm, and the reclining angle of the back part 20 may be 180 degrees.

According to the exemplary embodiment of the present disclosure, the seat of the vehicle may implement one of the general seating mode, the relax mode, the bed mode, or the cargo loading mode according to the changes in the vertical slide movement distance of the back part 20, the reclining angle of the back part 20, and the forward and backward slide movement distance of the leg part 30.

Further, the seat rail 200 according to the present disclosure includes the fixing rail 210 fixed to the floor panel 900, and the moving rail 220 moving along the fixing rail 210 and coupled to the leg part 30, and the moving rail 220 moves when unlocked and is fixed when locked, such that the entire length of the seat rail 200 may be adjusted.

As described above, the seat for the autonomous driving vehicle according to the present disclosure has a configuration in which the back part 20 and the leg part 30 are rotatably coupled to the cushion part 10, respectively, the back part 20 is installed to be vertically movable along the back rail 400 provided on the back panel 30, and the leg part 30 is installed to be movable back and forth along the seat rail 200 provided on the floor panel 900, and may change the posture of the seat in various forms, such as the general seating mode, the relax mode, the bed mode, and the cargo loading mode, according to the use purpose of the vehicle and the seating mode of the passenger in the autonomous driving situation, such that there is an advantage capable of achieving the improvement in the practicality and the merchantability.

While the specific exemplary embodiment of the present disclosure has been illustrated and described, it will be apparent to those skilled in the art that the present disclosure may be variously improved and changed without departing from the technical spirit of the present disclosure provided by the appended claims.

What is claimed is:

1. A seat posture adjustable structure for an autonomous driving vehicle, the seat posture adjustable structure comprising:
   a cushion part;
   a back part coupled to a rear end of the cushion part through a recliner and having an adjustable angle in a front and rear direction;
   a seat rail;
   a back rail; and
   a leg part rotatably coupled to a front end of the cushion part and having a lower side coupled to the seat rail,
   wherein the back part is disposed to be vertically movable along the back rail located on a rear side of the back part, and
   wherein the leg part is disposed to be movable back and forth by the seat rail.

2. The seat posture adjustable structure according to claim 1, further including a rail block,
   wherein the back rail is disposed on a back panel located on the rear side of the back part to extend vertically, and
   wherein the back rail is coupled to the rail block which is configured to move vertically along the back rail.

3. The seat posture adjustable structure according to claim 2, further including a first hinge pin,
   wherein the rail block and the back part are rotatably coupled through the first hinge pin.

4. The seat posture adjustable structure according to claim 1, wherein the seat rail comprises:
   a fixing rail fixedly disposed on a floor panel which is located on the lower side of the leg part, the fixing rail extending in the front and rear direction; and
   a moving rail coupled to the fixing rail and configured to move along the fixing rail in the front and rear direction, and
   wherein the lower side of the leg part is coupled to the moving rail.

5. The seat posture adjustable structure according to claim 1, further comprising a second hinge pin and a hinge part extending from an upper side of the leg part, and
   wherein, when the hinge part of the leg part is coupled through the second hinge pin while overlapping with the front end of the cushion part, the cushion part and the leg part are rotatably coupled.

6. The seat posture adjustable structure according to claim 1, wherein the cushion part extends in the front and rear direction which is a longitudinal direction of the seat rail, the back part vertically extends slantly at a predetermined angle with the cushion part, and
   wherein, when the leg part is disposed to vertically extend, the seat posture adjustable structure implements one of a general seating mode or a relax mode.

7. The seat posture adjustable structure according to claim 6, wherein, when the seat posture adjustable structure is in the general seating mode, a forward slide movement distance of the leg part and a reclining angle of the back part are smaller compared to when the seat posture adjustable structure is in the relax mode.

8. The seat posture adjustable structure according to claim 6, wherein, when the seat posture adjustable structure is in the relax mode, a forward slide movement distance of the leg part and a reclining angle of the back part are great greater compared to when the seat posture adjustable structure is in the general seating mode.

9. The seat posture adjustable structure according to claim 1, wherein the cushion part and the back part linearly extend in the front and rear direction which is a longitudinal direction of the seat rail, and
   wherein, when the leg part connected to the cushion part is disposed to vertically extend, the seat posture adjustable structure implements a bed mode.

10. The seat posture adjustable structure according to claim 2, wherein, when the cushion part, the back part, and the leg part linearly extend in the vertical direction which is a longitudinal direction of the back rail and are disposed to be in close contact with the back panel, the seat posture adjustable structure implements a cargo loading mode capable of loading a cargo in an inner space of the vehicle.

11. The seat posture adjustable structure according to claim 1, wherein the seat posture adjustable structure implements one of a general seating mode, a relax mode, a bed mode, or a cargo loading mode according to changes in a vertical slide movement distance of the back part, a reclining angle of the back part, and a forward and backward slide movement distance of the leg part.

* * * * *

UNITED STATES PATENT AND TRADEMARK OFFICE
CERTIFICATE OF CORRECTION

PATENT NO. : 12,012,017 B2
APPLICATION NO. : 17/339459
DATED : June 18, 2024
INVENTOR(S) : Bong Ku Kim et al.

Page 1 of 1

It is certified that error appears in the above-identified patent and that said Letters Patent is hereby corrected as shown below:

On the Title Page

Column 1, Item (73), replace the present listing with the following:
-- (73) Hyundai Motor Company, Seoul (KR); Kia Corporation, Seoul (KR) --

Signed and Sealed this
Twenty-fourth Day of December, 2024

Derrick Brent
*Acting Director of the United States Patent and Trademark Office*